(12) United States Patent
Saha et al.

(10) Patent No.: US 8,140,773 B2
(45) Date of Patent: Mar. 20, 2012

(54) USING EPHEMERAL STORES FOR FINE-GRAINED CONFLICT DETECTION IN A HARDWARE ACCELERATED STM

(76) Inventors: Bratin Saha, Santa Clara, CA (US); Ali-Reza Adl-Tabatabai, Santa Clara, CA (US); Gad Sheaffer, Haifa (IL); Quinn Jacobson, Sunnyvale, CA (US)

( * ) Notice: Subject to any disclaimer, the term of this patent is extended or adjusted under 35 U.S.C. 154(b) by 794 days.

(21) Appl. No.: 11/769,094

(22) Filed: Jun. 27, 2007

(65) Prior Publication Data

US 2009/0006767 A1    Jan. 1, 2009

(51) Int. Cl.
G06F 13/00 (2006.01)
(52) U.S. Cl. .................... 711/145; 711/154; 711/163
(58) Field of Classification Search .................. 711/152, 711/154
See application file for complete search history.

(56) References Cited

U.S. PATENT DOCUMENTS

| | | | |
|---|---|---|---|
| 7,502,897 B2 | 3/2009 | Hertzberg et al. | |
| 7,542,977 B2 | 6/2009 | Hudson et al. | |
| 2006/0085588 A1 | 4/2006 | Rajwar et al. | |
| 2006/0085591 A1 | 4/2006 | Kundu et al. | |
| 2006/0161740 A1 | 7/2006 | Crawford et al. | |
| 2007/0136289 A1 | 6/2007 | Adl-Tabatabai et al. | |
| 2007/0143287 A1 | 6/2007 | Adl-Tabatabai et al. | |
| 2007/0143741 A1* | 6/2007 | Harris ........................... 717/121 | |
| 2007/0143755 A1 | 6/2007 | Saha et al. | |
| 2007/0156780 A1 | 7/2007 | Saha et al. | |
| 2007/0156994 A1 | 7/2007 | Akkary et al. | |
| 2007/0186056 A1 | 8/2007 | Saha et al. | |
| 2007/0260608 A1 | 11/2007 | Hertzberg et al. | |
| 2007/0300238 A1 | 12/2007 | Kontothanassis et al. | |
| 2008/0005504 A1 | 1/2008 | Barnes et al. | |
| 2008/0040551 A1* | 2/2008 | Gray et al. ..................... 711/130 | |
| 2008/0065864 A1 | 3/2008 | Akkary et al. | |
| 2008/0162881 A1 | 7/2008 | Welc et al. | |
| 2008/0162885 A1 | 7/2008 | Adl-Tabatabai et al. | |
| 2008/0162886 A1 | 7/2008 | Saha et al. | |
| 2008/0162990 A1 | 7/2008 | Wang et al. | |
| 2008/0163220 A1 | 7/2008 | Saha et al. | |
| 2008/0270745 A1 | 10/2008 | Saha et al. | |

OTHER PUBLICATIONS

Ananian, C.S.; Asanovic, K.; Kuszmaul, B.C.; Leiserson, C.E.; Lie, S.; "Unbounded transactional memory", 11th International Symposium on High-Performance Computer Architecture, 2005. HPCA-11, Feb. 12-16, 2005 pp. 316-327.

Ravi Rajwar, Maurice Herlihy, and Konrad Lai. "Virtualizing Transactional Memory." In Proc. of the 32nd Annual Intl. Symp. On Computer Architecture, Jun. 2005.

(Continued)

*Primary Examiner* — Reba I. Elmore
(74) *Attorney, Agent, or Firm* — David P. McAbee

(57) ABSTRACT

A method and apparatus for fine-grained filtering in a hardware accelerated software transactional memory system is herein described. A data object, which may have any arbitrary size, is associated with a filter word. The filter word is in a first default state when no access, such as a read, from the data object has occurred during a pendancy of a transaction. Upon encountering a first access, such as a first read, from the data object, access barrier operations including an ephemeral/private store operation to set the filter word to a second state are performed. Upon a subsequent/redundant access, such as a second read, the access barrier operations are elided to accelerate the subsequent access, based on the filter word being set to the second state to indicate a previous access occurred.

29 Claims, 5 Drawing Sheets

OTHER PUBLICATIONS

Kevin E. Moore, Jayaram Bobba, Michelle J. Moravan, Mark D. Hill & David A. Wood, "LogTM: Log-based Transactional Memory," HPCA 2006.

M. Herlihy, V. Luchango, M. Moir and W.N. Scherer, "Software Transactional Memory for Dynamic Sized Data Structures", PODC 2003.

K, Fraser and T. Harris. Concurrent Programming without Locks.

T. Harris and S. Marlow, S.P. Jones, and M. Herlihy. Composable Memory Transactions. In Proceedings of the Tenth ACM Symposium on Principles and Practice of Parallel Programming, 2005.

M. Herlihy, V. Luchangco, M. Moir, and W.N. Scherer III. Software Transactional Memory for Dynamic-sized Data Structures. In Proceedings of the Twenty-Second ACM Symposium on Principles of Distributed Computing, 2003.

V. J. Marathe, W. N. Scherer III, and M. L. Scott. Adaptive Software Transactional Memory. In Proceedings of the Nineteenth International Symposium on Distributed Computing, 2005.

Timothy Harris, MarkPlesko, Avraham Shinnar and David Tarditi, Optimizing Memory Transactions. In Proceeding of Conference on Programming Language Design and Implementation, 2006.

H. Berenson, P. Bernstein, J. Gray, J. Melton, E. O'Neil, and P. O'Neil. "A critique of ANSI SQL isolation levels". In Proceedings of SIGMOD, pp. 1-10, 1995.

Torval Riegel, Christof Fetzer, and Pascal Felber, "Snapshot Isolation for Software Transactional Memory," TRANSACT'06.

"Implementing a High Performance Software Transactional Memory for a Multi-core Runtime" by Bratin Saha, Ali-Reza Adl-Tabatabai, Rick Hudson, Chi Cao Minh, and Ben Hertzberg, Proceedings of the eleventh ACM SIGPLAN symposium on Principles and practice of parallel programming, 2006.

"Software Transactional Memory" by N. Shavit and D. Tuitou, Proceedings of the Fourteenth ACM SIGACT-SIGOPS Symposium on Principles of Distributed Computing.

"Language Support for Lightweight Transactions", by T.L. Harris and K. Fraser, Proceedings of the 2003 ACM SIGPLAN Conference on Object-Oriented Programming Systems.

Languages and Applications; and "Compiler and runtime support for efficient software transactional memory," by Ali-Reza Adl-Tabatabai, Brian Lewis, Vijay Menon, Brian Murphy, Bratin Saha, and Tatiana Shpeisman. Proceedings of the 2006 ACM SIGPLAN conference on Programming language design and implementation.

* cited by examiner

USING EPHEMERAL STORES FOR FINE-GRAINED CONFLICT DETECTION IN A HARDWARE ACCELERATED STM

FIELD

This invention relates to the field of processor execution and, in particular, to execution of groups of instructions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. However, this increases programming complexity, as programmers have to account for more locks within a hash table.

Another data synchronization technique includes the use of transactional memory (TM). Often transactional execution includes speculatively executing a grouping of a plurality of micro-operations, operations, or instructions. In the example above, both threads execute within the hash table, and their accesses are monitored/tracked. If both threads access/alter the same entry, one of the transactions may be aborted to resolve the conflict. One type of transactional execution includes a Software Transactional Memory (STM), where accesses are tracked, conflict resolution, abort tasks, and other transactional tasks are performed in software.

However, the overhead performed to track accesses in software is potentially expensive. For example, in one implementation of an STM, a load operation in a transaction is logged for validation upon commitment of the transaction. However, subsequent reads to the same location may also be redundantly logged, which potentially wastes execution cycles within a transaction.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware support for transactional execution, specific tracking/meta-data methods, specific types of local/memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific multi-core and multi-threaded processor architectures, interrupt generation/handling, cache organizations, and specific operational details of microprocessors, have not been described in detail in order to avoid unnecessarily obscuring the present invention.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. However, other representations of values in computer systems have been used. For example the decimal number 10 may also be as a binary value of 1010 and a hexadecimal letter A.

Moreover, states may be represented by values or portions of values. As an example, a locked state may be represented by a first value in a location, such as an odd number, while a version number, such as an even value, in the location represents an unlocked state. Here, a portion of the first and second value may be used to represent the states, such as two lower bits of the values, a sign bit associated with the values, or other portion of the values.

The method and apparatus described herein are for accelerating a software transactional memory (STM) system. Specifically, accelerating a software transactional memory (STM) system is primarily discussed in reference to multi-core processor computer systems. However, the methods and apparatus for accelerating a software transactional memory (STM) system are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads, that utilize transactional memory.

Figure 1:
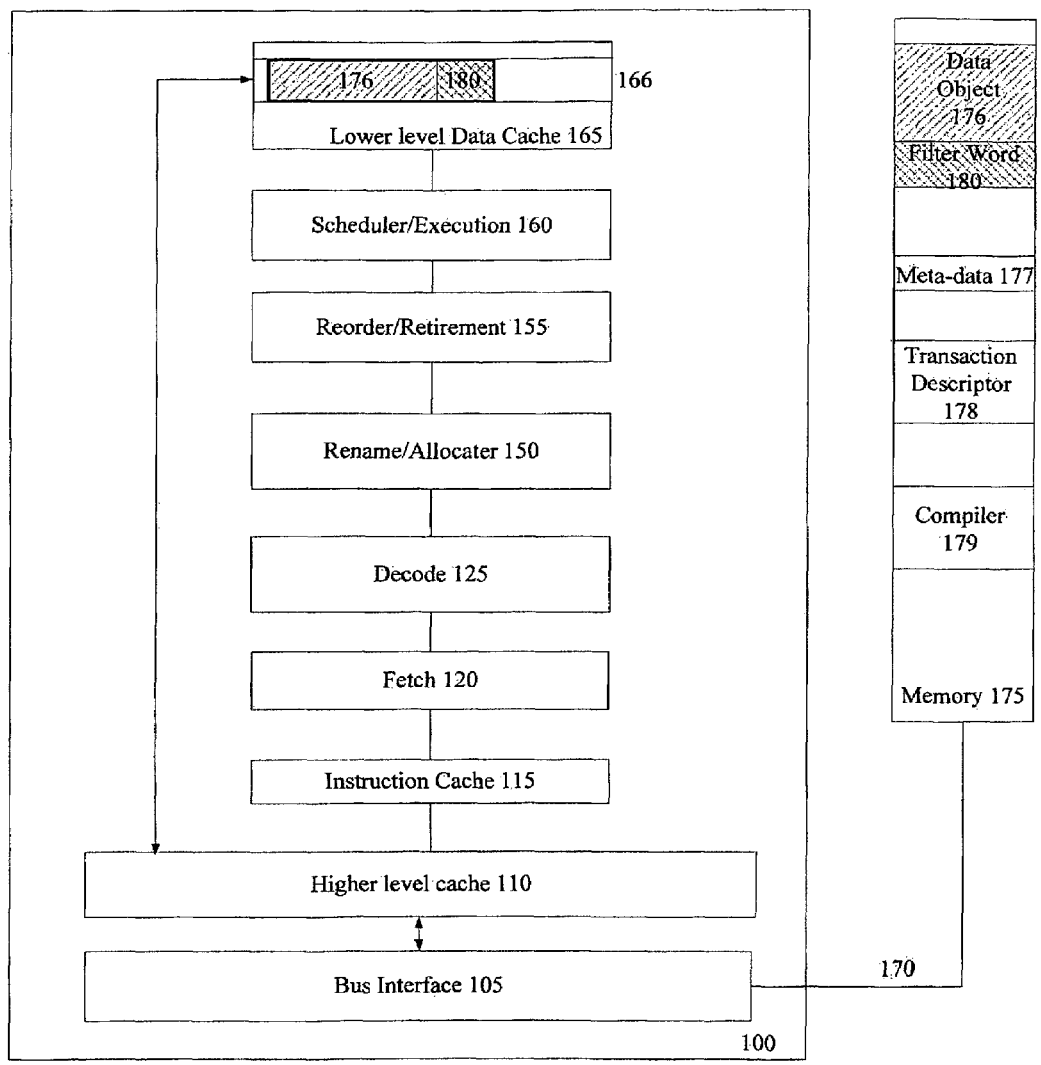
FIG. 1 illustrates as embodiment a system capable of fine grained conflict detection during transactional execution.

Referring to FIG. 1, an embodiment of a processor capable of accelerating a software transactional memory (STM) system is illustrated. In one embodiment, processor 100 is a multi-core processor capable of executing multiple threads in parallel. However processor 100 may include any processing element, such as an embedded processor, cell-processor, microprocessor, or other known processor, which is capable of executing one thread or multiple threads. As an illustrative example, a simplified embodiment of an out-of-order architecture for a processor is illustrated in FIG. 1.

The modules shown in processor 100, which are discussed in more detail below, are potentially implemented in hardware, software, firmware, or a combination thereof. Note that the illustrated modules are logical blocks, which may physically overlap the boundaries of other modules, and may be configured or interconnected in any manner. In addition, the modules as shown in FIG. 1 are not required in processor 100. Furthermore, other modules, units, and known processor features may also be included in processor 100.

Bus interface module 105 is to communicate with a device, such as system memory 175, a chipset, a north bridge, or other integrated circuit. Typically bus interface module 105 includes input/output (I/O) buffers to transmit and receive bus signals on interconnect 170. Examples of interconnect 170 include a Gunning Transceiver Logic (GTL) bus, a GTL+bus, a double data rate (DDR) bus, a pumped bus, a differential bus, a cache coherent bus, a point-to-point bus, a multi-drop bus or other known interconnect implementing any known bus protocol.

Processor 100 is coupled to memory 175, which may be dedicated to processor 100 or shared with other devices in a system. Examples of memory 175 includes dynamic random access memory (DRAM), static RAM (SRAM), non-volatile memory (NV memory), and long-term storage. Bus interface unit 105 as shown is also to communicate with higher level cache 110.

Higher-level cache 110 is to cache recently fetched and/or operated on elements. In one embodiment, higher-level cache 110 is a second-level data cache. However, higher level cache 110 is not so limited, as it may be or include instruction cache 115 to store recently fetched/decoded instructions. Instruction cache 115, which may also be referred to as a trace cache, is illustrated before fetch logic 120 and decode logic 125. Here, instruction cache 115 stores recently fetched instructions that have not been decoded. Yet, instruction cache 115 is potentially placed after fetch logic 120 and/or after decode logic 125 to store decoded instructions.

Fetch logic 120 is to fetch data/instructions to be operated on/executed. Although not shown, in one embodiment, fetch logic includes or is associated with branch prediction logic, a branch target buffer, and/or a prefetcher to predict branches to be executed/taken and pre-fetch instructions along a predicted branch for execution. Here, a processor capable of speculative execution potentially prefetches and speculatively executes predicted branches. Decode logic 125 is coupled to fetch logic 120 to decode fetched elements.

Allocator and renamer module 150 includes an allocator to reserve resources, such as register files to store instruction processing results and a reorder buffer to track instructions. Unit 150 may also include a register renamer to rename program/instruction reference registers to other registers internal to processor 100. Reorder/retirement module 155 includes components, such as the reorder buffers mentioned above, to support out-of-order execution and later retirement of instructions executed out-of-order. In one embodiment, where processor 100 is an in-order execution processor, reorder/retirement module 155 may not be included.

Scheduler and execution module 160, in one embodiment, includes a scheduler unit to schedule instructions/operations on execution units. Register files associated with execution units are also included to store information instruction processing results. Exemplary execution units include a floating point execution unit, an integer execution unit, a jump execution unit, a load execution unit, a store execution unit, and other known execution units.

Also shown in FIG. 1 is lower level data cache 165. Data cache 165 is to store recently used/operated on elements, such as data operands. In one embodiment, a data translation lookaside buffer (DTLB) is associated with lower level data cache 165. Often a processor logically views physical memory as a virtual memory space. As a specific example, a processor may include a page table structure to break physical memory into a plurality of virtual pages. Here, a DTLB supports translation of virtual to linear/physical addresses. Data cache 165 may be utilized as a transactional memory or other memory to track tentative accesses during execution of a transaction, as discussed in more detail below.

In one embodiment, processor 100 is a multi-core processor. A core often refers to any logic located on an integrated circuit capable of maintaining an independent architectural state, wherein each independently maintained architectural state is associated with at least some dedicated execution resources. In one embodiment, execution resources, such as execution module 160, include physically separate execution units dedicated to each core. However, execution module 160 may include execution units that are physically arranged as part of the same unit or in close proximity; yet, portions of execution module 160 are logically dedicated to each core. Furthermore, each core may share access to processor resources, such as higher level cache 110.

In another embodiment, processor 100 includes a plurality of hardware threads. A hardware thread typically refers to any logic located on an integrated circuit capable of maintaining an independent architectural state, wherein the independently maintained architectural states share access to some execution resources. For example, smaller resources, such as instruction pointers, renaming logic in rename allocater logic 150, an instruction translation buffer (ILTB) may be replicated for each hardware thread, while, resources, such as re-order buffers in reorder/retirement unit 155, load/store buffers, and queues may be shared by hardware threads through partitioning. Other resources, such as low-level data-cache and data-TLB 165, execution unit(s) 160, and parts of out-of-order unit 155 are potentially fully shared.

As can be seen, as certain processing resources are shared and others are dedicated to an architectural state, the line between the nomenclature of a hardware thread and core overlaps. Yet often, a core and a hardware thread are viewed by an operating system as individual logical processors, with each logical processor being capable of executing a software thread of execution. Logical processors may also be referred to herein as resources or processing resources. Therefore, a processor, such as processor 100, is capable of executing multiple threads on multiple logical processors/resources. Consequently, multiple transactions may be simultaneously and/or concurrently executed in processor 100.

A transaction includes a grouping of instructions, operations, or micro-operations, which may be grouped by hardware, software, firmware, or a combination thereof. For example, instructions may be used to demarcate a transaction. Typically, during execution of a transaction, updates to memory are not made globally visible until the transaction is committed. While the transaction is still pending, locations loaded from and written to within a memory are tracked. Upon successful validation of those memory locations, the transaction is committed and updates made during the transaction are made globally visible. However, if the transaction is invalidated during its pendancy, the transaction is restarted without making the updates globally visible. As a result, pendancy of a transaction, as used herein, refers to a transaction that has begun execution and has not been committed or aborted, i.e. pending. Two example systems for transactional execution include a Hardware Transactional Memory (HTM) system and a Software Transactional Memory (STM) system.

A Hardware Transactional Memory (HTM) system often refers to tracking access during execution of a transaction with processor 100 in hardware of processor 100. For example, a cache line 166 is to cache data item/object 176 from system memory 175. During execution of a transaction, an annotation/attribute field, which is associated with cache line 166, is utilized to track accesses to and from line 166. However, cache line annotation bits at a cache line level potentially does not provide adequate granularity for each data objects. Examples of utilizing an attribute field for transactional execution are included in co-pending application filed on Dec. 29, 2004 and given U.S. Ser. No. 11/027,623, now issued as U.S. Pat. No. 7,984,248, and entitled, "Transaction based shared data operations in a Multiprocessor Environment."

A Software Transactional Memory (STM) system often refers to performing access tracking, conflict resolution, or other transactional memory tasks in software. As a general example, compiler 179 in system memory 175, when executed by processor 100, compiles program code to insert read and write barriers into load and store operations, accordingly, which are part of transactions within the program code. Compiler 179 may also insert other transaction related operations, such as commit or abort operations.

As shown, cache 165 is still to cache data object 176, as well as meta-data 177 and transaction descriptor 178. However, meta-data location 177 is associated with data item 176 to indicate if data item 176 is locked. A read log, which may be present in transaction descriptor 178, is used to log read operations, while a write buffer or other transactional memory, which may include lower-level data cache 165, is used to buffer or log write operations. Inserted calls for validation and commit utilize the logs to detect conflicts and validate transaction operations. However, as software intervention to track every access in a transaction is potentially expensive, filter word 180 is associated with data object 176 to store access related information to accelerate STMs.

Figure 2:
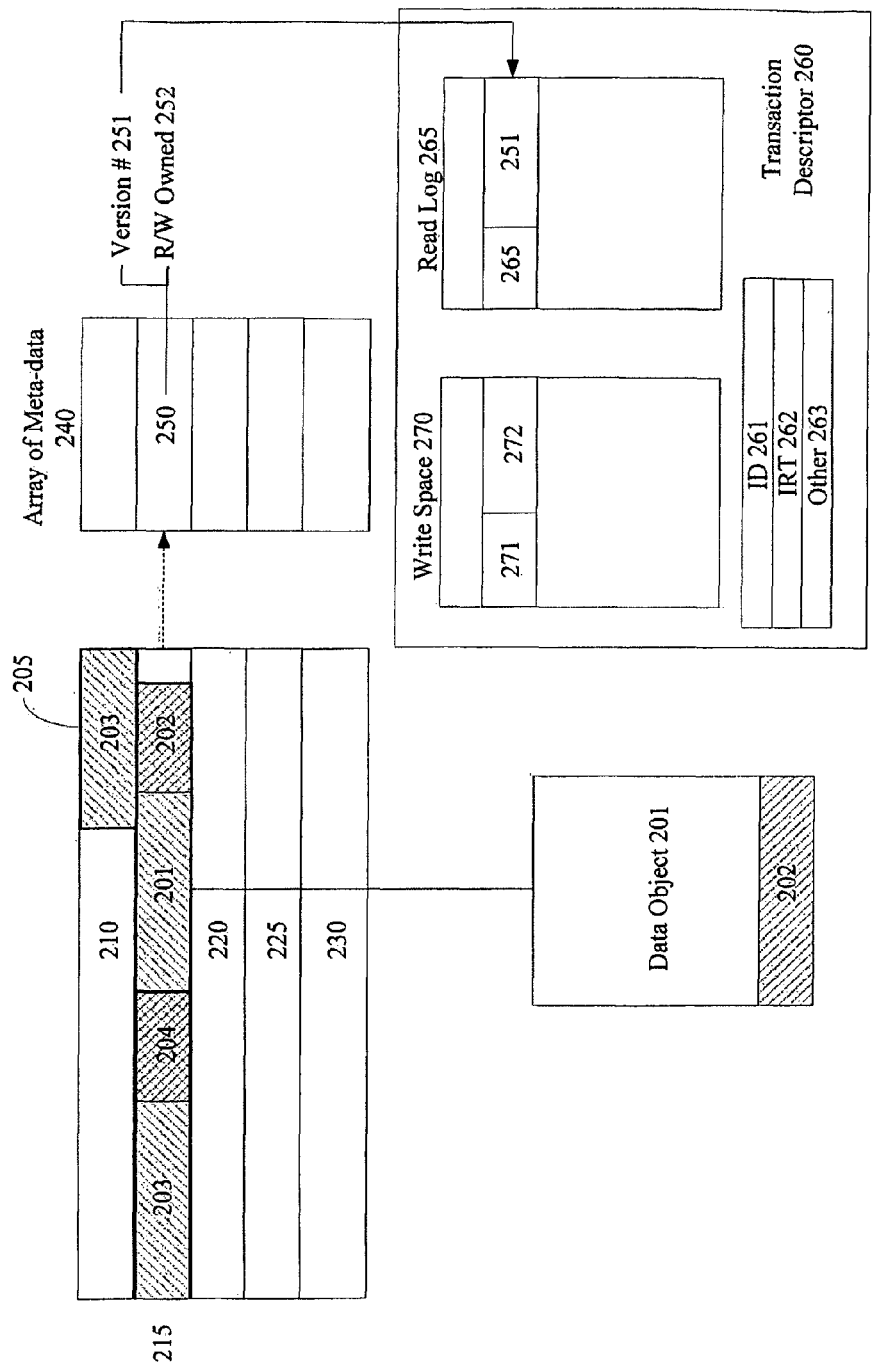
FIG. 2 illustrates an embodiment of a fine grained accelerated Software Transactional Memory (STM) system.

Referring to FIG. 2, an embodiment of a STM system capable of fine grained, i.e. per data object, conflict detection utilizing filter words is illustrated. Data object 201 includes any granularity of data, such as a word, a data element/operand, an instruction, a line of memory, a cache line, a programming language defined object, a field of a programming language defined object, a table, a hash table, or any other known data structure or object. For example, a programming language defined data object, such as a table, is data object 201, which includes filter word 202 as an entry in the table. As shown, data object 201 includes filter word 202; however, filter word 202 may be associated with data object 201 in any manner, such as appended to data object 201. In one embodiment, an address referencing data object 201 is hashed to index an array of filter words including filter word 202. In another embodiment, data object 201 includes a pointer to filter word 202.

Transactional memory 205 includes any memory to store elements associated with transactions. Here, transactional memory 205 comprises plurality of lines 210, 215, 220, 225, and 230. In one embodiment, memory 205 is a cache memory. As an example, data object 201 is to be stored aligned in cache line 215. Alternatively, data object 201, as shown, is capable of being stored unaligned in memory 205. Here, data object 201, including filter word 202, is included within cache line 215. However, a data object may span multiple cache lines, such as data object 203 and filter word 204, which span cache lines 210 and 215. Data object 201 includes any arbitrary size, such as a size smaller than a cache line (i.e. multiple elements per cache line), a size of a cache line, or a size larger than a cache line (i.e. multiple cache lines per element).

In one example, each data object is associated with a meta-data location in array of meta-data 240. As an illustrative embodiment, an address associated with cache line 215 or directly with data object 201 is hashed to index array 240, which associates meta-data location 250 with cache line 215 and data object 201. However, meta-data location 250 may be associated with data object 201 and/or cache line 215 in any manner. For example, the meta-data location may also be part of object 201.

Usually, meta-data location 250 represents whether data object 201 is locked or available. In one embodiment, when data object 201 is locked, meta-data location 250 includes a first value to represent a locked state, such as read/write owned state 252. Yet, any lock or lock state may be utilized and represented in meta-data location 250. When unlocked, or available, meta-data location 250 includes a second value. In one embodiment, the second value is to represent version number 251. Here, version number 251 is updated, such as incremented, upon a write to data object 201, to track a current version of data object 201.

As an example to illustrate operation of the embodiment shown in FIG. 2, in response to a first read operation in a transaction referencing data object 201/cache line 215, the read is logged in read log 265. This logging is often referred to as a read barrier, since the logging is a barrier for the read to be performed. In one embodiment read log 265 is included in transaction descriptor 260. Transaction descriptor may also include write space 270, as well as other information associated with a transaction, such as transaction identifier (ID) 261, and other transaction information. However, write space 270 and read log 265 are not required to be included in transaction descriptor 260. For example, write space 270 may be separately included in a different memory space from read log 265 and/or transaction descriptor 260.

In one embodiment, logging a read includes storing version number 251 and an address associated with data object 201 or cache 215 in read log 265. Here, assume version number 251 is one to simplify the example. Upon encountering a write referencing an address associated with data object 201, the write is potentially logged or tracked as a tentative update. In addition, the meta-data location is updated to a lock value, such as two, to represent data object 201 is locked by the transaction or resource executing the transaction. In one embodiment, the lock value is updated utilizing an atomic operation, such as a read, modify, and write (RMW) instruction. Examples of RMW instructions include Bit-test and Set, Compare and Swap, and Add.

In one embodiment, the write updates cache line 215 with a new value, and an old value 272 is stored in write space 270. Here, upon committing the transaction, the old values in the write space are discarded, and conversely, upon aborting the transaction, the old values are restored, i.e. the locations are "rolled-back" to their original values before the transaction. Examples of write space 270 include a write log, a group of check pointing registers, and a storage space to log/checkpoint values to be updated during a transaction.

In another embodiment, write space 270 is a buffer that buffers/stores the new value to be written to data object 201. Here, in response to a commit, the new values are written to their corresponding locations, while in response to an abort the new values in write space 270 are discarded. Continuing the example from above, whether write space 270 is utilized as a write-buffer, a write-log, or not at all, the write, when committed, releases lock 250. In one embodiment, releasing lock 250 includes returning meta-data location 250 to a value of one to represent an unlocked state. Alternatively, the value is incremented to represent unlocked version value 251 of three. This versioning allows for other transactions to validate their reads that loaded data object 201 by comparing the other transactions logged version values in their read logs to current version value 251.

The example above includes one embodiment of implementing an STM; however, any known implementation of an STM may be used. In fact, any known system for performing transactional memory may also be used, such as an HTM, an STM, an Unbounded Transactional Memory (UTM) system, a hybrid Transactional Memory system, such as a hardware accelerated STM (HASTM), or any other transactional memory system. Co-pending and related application entitled, "Hardware Acceleration of a write-buffering software transactional memory," filed on Apr. 9, 2007 and given U.S. Ser. No. 11/784,859, discusses hardware acceleration of an STM. Co-pending application entitled, "Overflow Method for Virtualized Transactional Memory," filed on Jun. 30, 2006 and given U.S. Ser. No. 11/479,902, discusses extending/virtualizing an HTM.

In one embodiment, filter word/field 202 is associated with data object 201 to provide fine grained access tracking and conflict detection for data object 201 during transactional execution. Filter word 202 may be any size of element or object to store information associated with data object 201. In one embodiment, filter word 202 is the size of a word; however, filter word/field 202 may be a field smaller than a word, as well as any other size object. As stated above, filter field 202 may be associated with data object 201 in any manner, such as being included as a field in data object 201, appended to data object 201, pointed to by a pointer in data object 201, or referenced in association with data object 201.

Filter word 202, in one embodiment, is to accelerate accesses in a transaction. For example, filter word 202 is initialized to a first value, such as zero. In response to a first access operation in a first transaction, which references data object 201, access barrier code is executed. The access barrier code includes a first operation to check filter word 202. Filter word 202 including the first value of zero represents that data object 201 has not been previously access during a pendancy of the transaction. As a result, barrier operations, such as logging of a read or acquiring a lock for a write, are performed. In addition, a private store or ephemeral store is executed to set filter word 202 to a second value, such as a one. A private store, which is also referred to as an ephemeral store, includes a store operation to update filter word 202. In one embodiment, in response to a private store operation cache line 215 is transitioned to a private cache coherency state. Cache coherency states, including a private state, will be discussed in more detail below.

Next, in response to a subsequent access operation in the first transaction, which references data object 201, filter word 202 is checked again. However, this time filter word 202 includes the second value, i.e. a one, to represent a previous access to data object 201 has occurred during a pendancy of the first transaction. Therefore, access barrier operations, such as setting filter word 202, logging a read, and acquiring a write-lock, are elided based on filter word 202 being set. Here, eliding operations refers to not executing operations; however, eliding operations may also include any method for not performing inserted access barrier operations.

As a specific illustrated example, a compiler inserts a function call to an access barrier in response to detecting an access operation in a transaction. The access barrier function includes an operation to check the state of filter word 202. If filter word 202 is in a first state, a plurality of barrier operations are performed. However, if filter word 202 is in a second state, then the plurality of barrier operations are elided. As a result, when servicing subsequent accesses to data object 201 within the first transaction, the subsequent accesses are potentially accelerated, as access barrier operations associated with the subsequent accesses are elided. The ability to reduce redundant access barrier operations accelerates an STM, i.e. saves execution cycles by not re-executing barrier operations associated with redundant access operations.

An access, or access operation, refers to any access to data object 201 or cache line 215, such as a read, a write, a load, a store, as well as any other known access. In one embodiment, an access includes a read instruction. Here, when a compiler detects a read instruction in a transaction, read barrier code is inserted to perform read barrier tasks, such as logging version 251 in read log 265. Figure A below illustrates an embodiment of pseudo code for a read barrier.

```
Read Barrier {
    If (data_object.filterword == 0) {
        Log a version of data_object in read log;
        Data_object.filterword = ephemeralstore(1);
    }
Return;}
```

Figure A: an Embodiment of Pseudo Code for a Read Barrier

When executing the read barrier illustrated in Figure A, the filter word associated with data_object, i.e. data_object.filterword, is checked to determine if it holds a first value of zero to represent no previous access to the data_object has occurred during execution of the transaction. If data_object.filterword holds a 0, then a version of data_object is logged and data_object.filterword is updated to a value of 1 with an ephemeral/private store.

As a result, when a second read operation, which references the data_object, is encountered during execution of the transaction, the operation in the read barrier of Figure A to check data_object.filterword is executed again. However, as data_object.filterword is now set to 1, the version logging and the ephemeral store, which have already been performed, are elided and execution returns to perform the second read.

Note that an operation to determine if filter word 202 represents a previous read to data object 201 occurred during a transaction, may be inserted in a read barrier, as illustrated in Figure A, or outside the read barrier before a read operation. In the second instance, filter word 202 is checked before performing a read operation, and if filter word 202 represents that data object 201 has been previously read during execution of the transaction, then a read barrier is not executed/called. As an illustrative example a pseudo code statement of the following may be inserted: If(data_object 201.filter_word 202==0){execute read barrier}{else perform the read of data_object_201}.

In another embodiment, an access operation includes a write operation/instruction. Similar to operation of the read barrier disclosed above, a write barrier may be associated with a write operation. The write barrier may be performed upon a first write to data object 202, and the barrier may be elided up on a subsequent write to data object 202.

As an example of a write barrier, a write-lock may be acquired for data object 201 upon encountering a write operation. Alternatively, writes may be buffered in write space 270 for the duration of the transaction and write locks acquired upon commitment of the transaction for data to be copied from write space 270 to a program stack. Here, a write barrier potentially includes operations associated with buffering the data in write space 270. In another implementation, tentative writes may modify their corresponding locations and write space 270 logs original values in case of transaction roll-back. Analogous to read logging, in this example, a write barrier includes write logging. In addition, updating filter word 202 may also be considered a write barrier or a portion of a write barrier.

Therefore, by default, upon commitment of a previous transaction, or upon initialization of a current transaction, filter word 202 is set to a first value, such as a zero, to represent no previous modifications of data object 201 have occurred during execution of the current transaction. In response to encountering a write operation, it is determined that filter word 202 includes the first value. As a result, write barrier code/operations, such as acquiring a write-lock or logging/checkpointing original values, are executed. In addition, the write barrier sets filter word 202 to a second value, such as a one. Later, if a subsequent write to data object 201 is encountered, the original value is already logged and/or a write lock is already acquired, i.e. the write barrier has already been performed, as represented by filter word 202 being set to the second value. Therefore, the write barrier is elided based on filter word 202.

Consequently, a S™ is accelerated through use of filter word 202 by allowing redundant accesses in a transaction to avoid performing the same access barriers. However, use of filter word 202 is not so limited, as it may store any information related to data object 201. In one embodiment, both reads and writes to data object 201 are tracked utilizing filter word 202. In addition, a resource ID field, to track the resource, such as a core or thread, which accessed data object 201 may be included in filter word 202.

Furthermore, filter word 202 may be used to accelerate a write-buffering STM by providing information/hints about the locality of the most recent elements to be provided in response to accesses. Co-pending and related application entitled, "Hardware Acceleration of a write-buffering software transactional memory," filed on Apr. 9, 2007 and given U.S. Ser. No. 11/784,859, discusses hardware acceleration of an STM utilizing annotation bits. Filter word 202 may be utilized to store annotation information on a per data object granularity.

An embodiment of using filter word 202 to track resource ID's, reads, and writes is illustrated below the Figure B.

| FIG. B: An embodiment of filter word values | | | |
|---|---|---|---|
| Resource ID | State | Value | Represents |
| X | 1st state | One | Default: No Read and No Write |
| T0 | 2nd state | Two | Read and No Write |
| T0 | 3rd state | Three | No Read and Write |
| T0 | 4th state | Four | Read and Write |

Here, filter word includes two portions, a first portion to store a resource ID and a second portion to store a state/value to track accesses and detect conflicts. Filter word 202 is initialized or reset to the first state with value of one to represent no read and no write has occurred to data object 201 during execution of the transaction. Upon a read, filter word 202 is set to the second state to represent a read occurred during execution of the transaction. Furthermore, a resource ID, such as T0 may be stored in the first portion to represent, thread 0 performed the write. Note that a transaction ID may be utilized here as well in place of a resource ID. Similarly, to represent a write and no previous read, the second portion is set to the third state, and the fourth state is to represent a read and a write has occurred.

As stated above, in one embodiment, in response to setting filter word 202, cache line 215 is transitioned into a private cache coherency state. Common cache coherency states include Modified, Exclusive, Invalid, and Shared (MESI) states. Commonly, when a store or write to a cache line occurs, the cache line is placed in a modified state to indicate the cache line has been updated. Yet, in one embodiment, filter word 202 is updated with a private, or ephemeral, store operation. Essentially, filter word 202 is locally updated to perform tracking and conflict detection; however, the update to filter word 202 is not made globally visible.

Therefore, in response to a private store to modify filter word 202, cache line 215 is placed in/transitioned to a private cache coherency state. In one embodiment, when cache line 215 is in a private state and is evicted, filter word 202 information is discarded and not written back to data object 201. In another embodiment, in response to a write operation, cache line 215 is requested to be transitioned to a modified state from a private state. Here, cache line 215 is first invalidated, i.e. put in an invalid state, data object 201 is read back into cache line 215, and then the write is performed.

As a result of utilizing private/ephemeral stores, multiple processing elements may simultaneously make ephemeral stores into the same location. In other words, each processing element that makes an ephemeral store to filter word 202, holds a private copy of filter word 202. This allows the same object to be accessed concurrently by multiple transactions, while still providing for acceleration of transactions.

Figure 3:
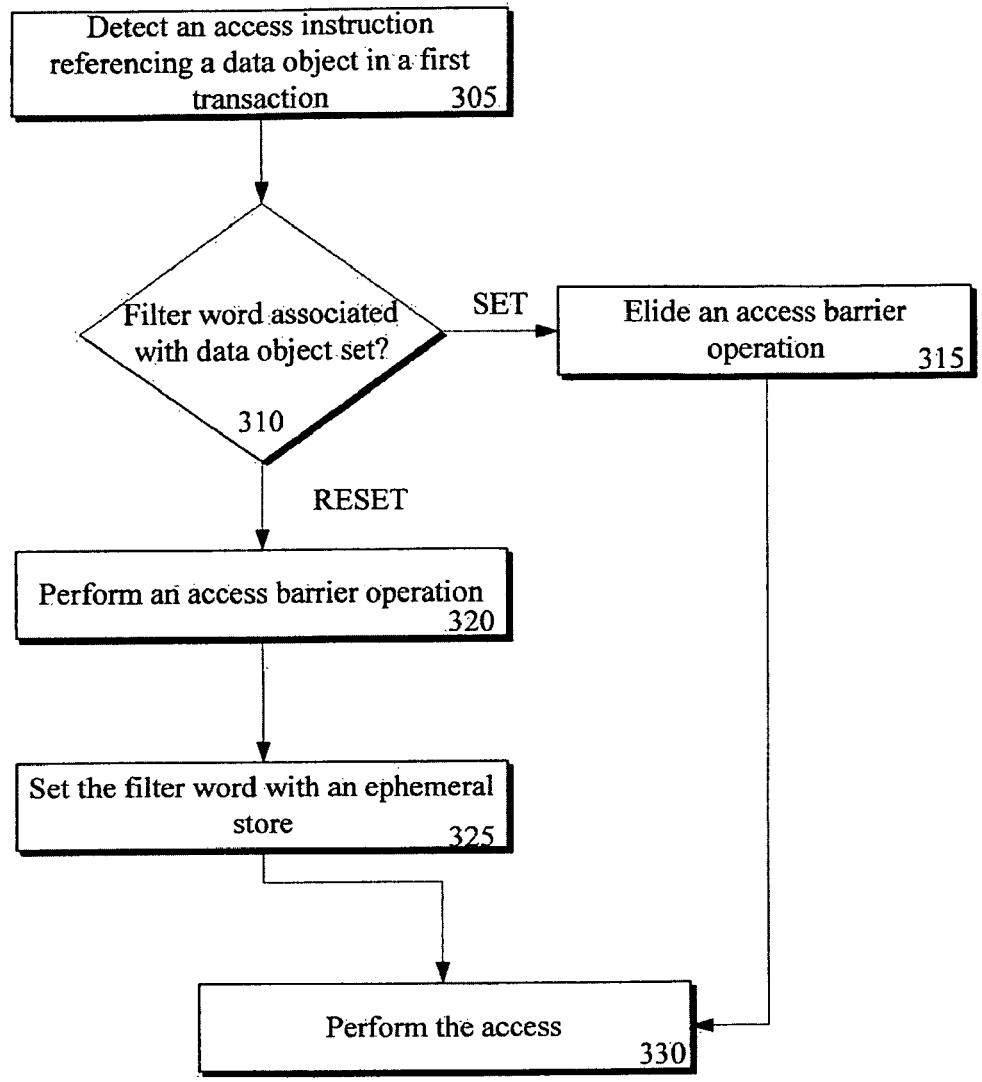
FIG. 3 illustrates an embodiment of a flow diagram for a method of accelerating a software Transactional Memory (STM) system.

Turning to FIG. 3, an embodiment of a flow diagram for a method of accelerating an STM system is illustrated. In flow 305, an access instruction referencing a first data object is detected. Next, in flow 310, a filter word associated with the data object is checked. If the filter word is reset, i.e. it holds a first value, then the filter word indicates no previous access to the data object during a pendancy of the transaction. Therefore, in flow 320, an access barrier operation is performed. For example, a logging operation or set of operations associated with the access is performed.

In addition, the filter word is set to indicate an access has occurred during execution of the transaction. However, returning to flow 310, if the filter word associated with the data object was set to indicate a previous access to the data object occurred, then the access barrier operation is elided in flow 315.

Whether, after the elision in flow 315 or after performing access barrier operations in flows 320 and 325, the access is performed in flow 330. As a result, when first accesses in a transaction are encountered, associated barrier operations are performed. However, subsequent access barrier instructions within a transaction are accelerated, as barrier operations associated with the subsequent access barrier instructions are able to be elided.

Figure 4:
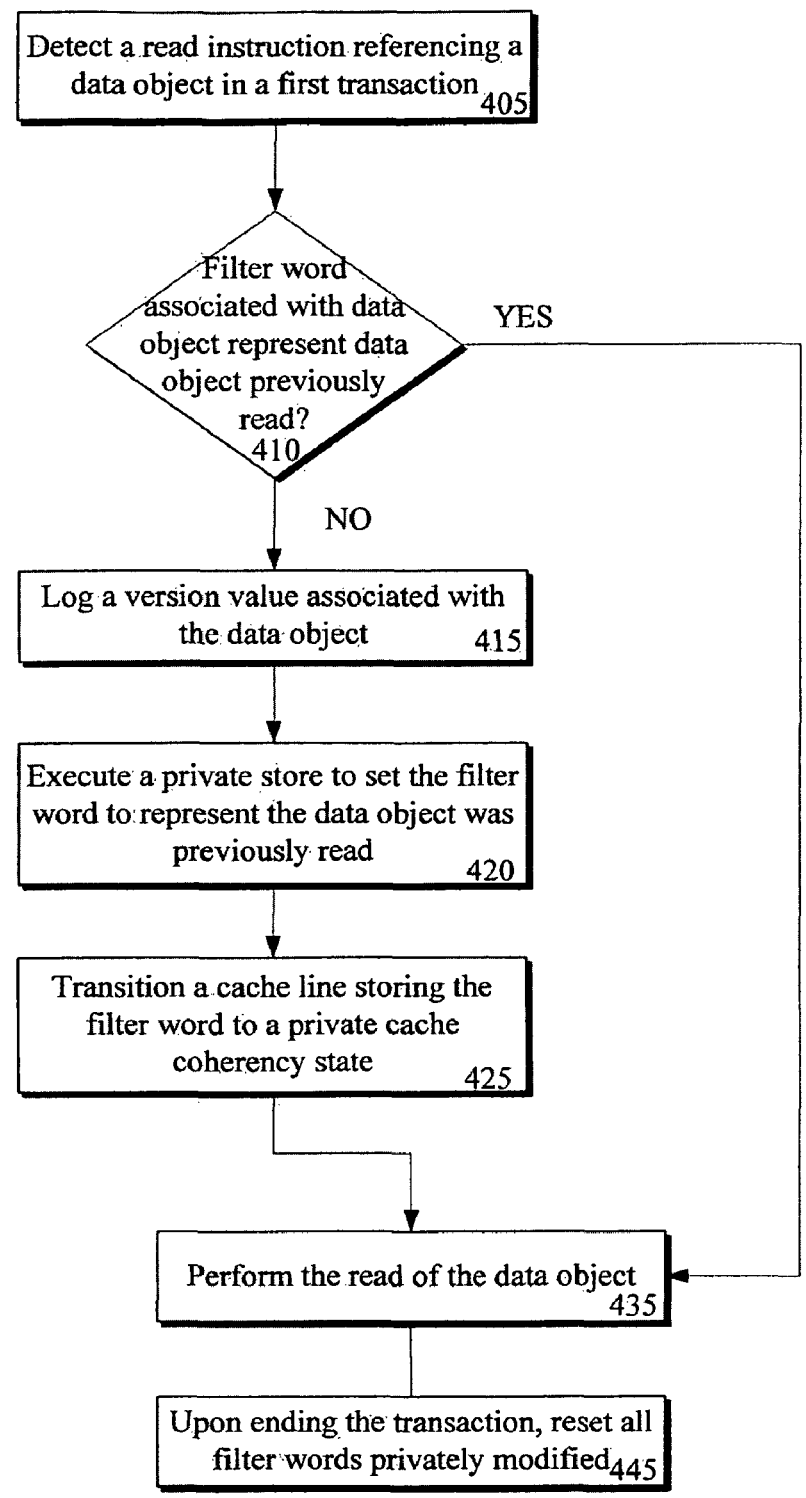
FIG. 4 illustrates an embodiment of a flow diagram for a method of accelerating read instructions in a Software Transactional Memory (STM) system.

Turning to FIG. 4, an embodiment of flow diagram for a method of accelerating reads in a transaction is illustrated. In flow 405, a read instruction referencing a data object in a first transaction is detected. It is determined if a filter word associated with the data object represents that the data objects was previously read during a pendancy of the first transaction. If the filter word holds a first value indicating the data object was not previously read, then in flow 425 a version value associated with the data object is logged.

In one embodiment, logging a version value includes copying a version in a meta-data location associated with the data object to a read log entry. Next, in flow 420, a private store is executed to set the filter word to indicate that the data object was previously read. As stated above, a private store includes any operation to modify the filter word. Often, the results of a private store are not made globally visible. Therefore, in flow 425, a cache line holding the filter word is transitioned to a private cache coherency state. As a result, in response to an eviction of the cache line, the contents of the filter word are not written back to memory. Moreover, when a request to transition the cache line from a private state to a modified state is detected, the cache line is invalidated, the new line is brought to the cache, and then the operation requesting the transition is performed. Finally, the read of the data object is performed inflow 435.

In a return to flow 405, a subsequent read instruction referencing the data object in the first transaction is detected. Again, it is determined if the filter word associated with the data object represents that the data object was previously read during execution of the first transaction. Here, the filter word was previously set in response to the first read. Therefore, the filter word now indicates a previous read to the data object has occurred. As a result, the read of the data object is performed in flow 435 without logging the version in flow 415, executing the private store in flow 420, and transitioning the cache line in flow 425, as those operations were performed in response to the first read operation. Note, performing the read directly without moving through flow 415, 420, and 425 is often referred to as eliding those operations. Finally, when the transaction concludes, all the filter words that were updated with the private stores are reset to the default state. In one embodiment, an instruction set, i.e. instructions recognized by a processing element, includes a reset instruction to reset all the private store locations.

Figure 5:
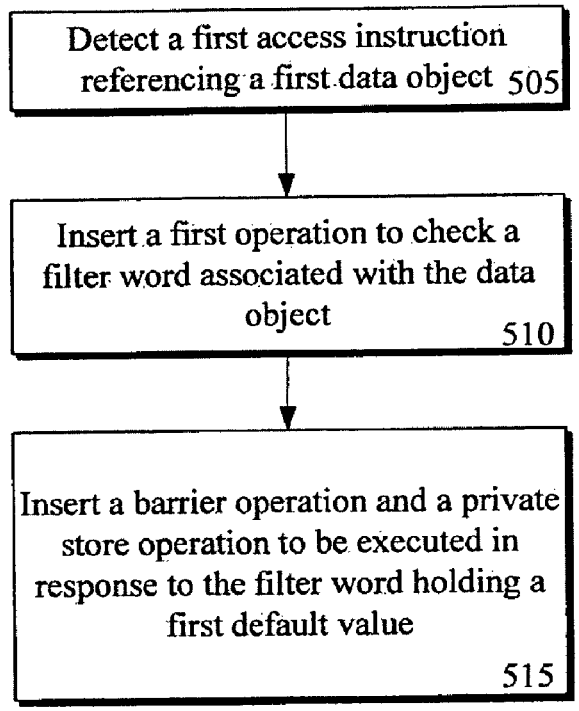
FIG. 5 illustrates an embodiment of a flow diagram for a method of a compiler inserting operations to accelerate write instructions in a Software Transactional Memory (STM) system.

Referring next to FIG. 5, an embodiment of a flow diagram for a method of inserting operations to accelerate an STM utilizing filters is illustrated. In one embodiment, a compiler, when executed, compiles and optimizes program code including transactions and access operations. In one embodiment, during the compilation and optimization, the following instructions/operations are inserted to accelerate accesses in an STM. In flow 505, an access operation is detected. Examples of an access operation include a read and a write operation.

In response to detecting the access operation, a first operation to check a filter word associated with a data object referenced by the access operation is inserted in flow 510. Here, the operation includes a read or other operation to determine the value of the filter word. In another embodiment, operations to perform an if statement to determine if the filter word includes a first default value is inserted.

Next, in flow 515, a barrier operation and a private store operation are inserted to be executed if the filter word is determined to hold the default first value. The barrier operation includes an operation, such as logging the access, acquiring a lock for the access, or other access related operations. The private store is to modify the filter word from the first value to a second value to indicate the data object has been previously accessed and the associated access barriers have been previously performed.

As an example, assuming the access is a read operation, when the program code is executed, the filter word for a referenced data-object is checked. If this is the first read in the transaction to the data object, then the filter word includes the default first value. As a result, the barrier operation and private store are executed. However, if the read operation is a redundant read to the data object, then the barrier operation and private store are elided, i.e. not performed, but rather the read operation is directly performed/serviced.

As illustrated above, access tracking and conflict detection for transactions may be performed on an arbitrary granularity of data object instead of just on a cache line basis. As a result, filter words associated with arbitrary size data-objects are used to accelerate redundant accesses to the data-objects within transactions.

The embodiments of methods, software, firmware or code set forth above may be implemented via instructions or code stored on a machine-accessible or machine readable medium which are executable by a processing element. A machine-accessible/readable medium includes any tangible mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; or any other form of a tangible storage medium to store information.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
    a processing element to execute a transaction;
    a memory associated with the processing element, the memory to include a memory line to store a data object, which is to be associated with a filter word, wherein before executing a first read operation, which is in the transaction and references the data object, the processing element is to execute barrier code including a logging operation to log a value associated with the data object and a private store operation to set the first filter word to an accessed value and to cause the memory line to transition to a private cache coherency state, and wherein before executing a subsequent read operation, which also is in the first transaction and references the first data object, the processor is to elide at least a portion of the barrier code based on the first filter word being set to the accessed value.

2. The apparatus of claim 1, wherein the memory includes a cache memory the memory line includes a cache memory line, and the filter word is held as part of a data structure of the data object.

3. The apparatus of claim 1, wherein an additional processing element is to simultaneously perform a private store operation to the filter word.

4. The apparatus of claim 1, wherein the processing element is also to execute a reset private store instruction to reset the filter word to a default value.

5. The apparatus of claim 1, wherein in response to requesting a transition of the first line of cache to a modified cache coherency state from the private cache coherency state, the first cache line is to be transitioned to an invalid cache coherency state.

6. A system comprising:
a system memory to store a data item; and
a processing element in a processor, which is coupled to the system memory, to execute a number of operations grouped into a transaction, the processor including a cache memory, wherein a cache line of the cache memory is to hold the data item and an associated filter word, and wherein the processing element, in response to an access operation of the first number of operations, which references the first data item, is to: elide a plurality of barrier operations, in response to the filter word holding an accessed value; and to execute a private store operation to set the filter word to the accessed value and to transition the cache line to a private cache coherency state, in response to the filter word holding an un-accessed value, and wherein upon commit of the transaction, the processing element is to execute a reset operation to reset the filter word to the un-accessed value.

7. The system of claim 6, wherein an additional processing element is to simultaneously perform a private store operation to the filter word.

8. A method comprising:
during runtime execution and before performing a read operation in a first transaction:
determining if a data object, which is referenced by the read operation, has been previously read during a pendancy of the first transaction based on a filter word associated with the data item;
eliding a read barrier associated with the access operation in response to determining the data item has been previously read during the pendancy of the first transaction; and
executing the read barrier associated with the read operation in response to determining the data item has not been previously read during the pendancy of the first transaction.

9. The method of claim 8, determining if a data object, which is referenced by the read operation, has been previously accessed during a pendancy of the first transaction based on a filter word associated with the data item comprises:
checking the filter word;
determining the data object has not been previously read during a pendancy of the first transaction, if the filter word includes a first value; and
determining the data object has been previously read during a pendancy of the first transaction, if the filter word includes a second value.

10. The method of claim 9, wherein a cache line in a cache memory is to store the data object and the filter word unaligned.

11. The method of claim 10, wherein the read barrier is selected from a group consisting of a logging operation to log a version value associated with the data object, an ephemeral store to privately set the filter word to the second value, and a request to request the cache line be transitioned to a private cache coherency state.

12. The method of claim 10, further comprising in response to detecting a write operation in the first transaction, which references the data object:
determining the data object has not been previously modified during a pendancy of the first transaction, if the filter word includes a third value; and
determining the current data object has been previously modified during a pendancy of the first transaction, if the first filter word includes a fourth value; and
executing a write barrier operation associated with the write operation in response to determining the data object has not been previously modified during the pendancy of the first transaction
eliding a write barrier operation associated with the write operation in response to determining the data object has been previously modified during the pendancy of the first transaction.

13. The method of claim 12, wherein the write barrier is selected from a group consisting of a read, modify, and write (RMW) operation to acquire a write lock associated with the data object, a logging operation to log a value associated with the data object, an ephemeral store to privately set the filter word in the cache line to the fourth value, and a request to request the cache line be transitioned to a private cache coherency state.

14. A non-transitory machine readable medium including compiler code which, when executed by, causes the machine to perform the operations of:
detecting an access instruction in a first transaction within program code stored on a non-transitory storage medium associated with the machine, the access instruction referencing a data object;
transforming the program code into compiled program code stored on the non-transitory storage medium, wherein the transforming of the program code into compiled program code includes,
inserting a first operation into the compiled program code, when executed, to cause a machine to check a first filter word associated with the data object before the access instruction referencing the data object; and
inserting a private store operation into the compiled program code when executed, to cause a machine to set the first filter word in a line of a cache memory privately to a previously accessed value and to transition the line in the cache memory to a private cache coherency state, in response to the first filter word holding a not previously accessed value.

15. The machine readable medium of claim 14, wherein the access instruction includes a write instruction.

16. The machine readable medium of claim 14, wherein the access instruction includes a read instruction, and wherein the barrier operation includes a logging operation to log a version value associated with the data object in a read log.

17. The machine readable medium of claim 16, wherein a first filter word associated with the data object comprises an association selected from a group consisting of: an address associated with the data object hashed into a value referencing the first filter word, the first filter word appended to the data object, and a pointer to the first filter word in the data object.

18. The machine readable medium of claim 14, wherein the first operation to check a first filter word associated with the data object is capable of being simultaneously executed by multiple processing elements in the machine.

19. The machine readable medium of claim 16, further comprising inserting a reset all private store instruction to reset the first filter word to a default value.

20. A processor comprising:
    decode logic to decode a private store operation and a subsequent transactional memory access operation, which is to be part of a transaction;
    execution logic coupled to the decode logic to execute the private store operation to update a filter field to an accessed value, wherein the filter field is to be associated with a data object that is to be referenced by the subsequent transactional memory access operation; and
    a cache memory coupled to the execution logic, the cache memory including a cache line to hold the filter field that is to be associated with the data object, wherein the cache memory is to transition the cache line to a private coherency state in response to the execution logic to execute the private store operation to update the filter field.

21. The processor of claim 20, wherein in response to selection of the cache line for eviction by the cache memory and the cache line holding the filter field in the private coherency state, the contents of the filter word are discarded and not written-back to a higher-level memory.

22. The processor of claim 20, wherein in response to the cache line holding the filter field in the private coherency state and a modify operation requesting the cache line to be transitioned to a modified coherency state, the cache line is invalidated and a higher-level copy of the cache line is read into the cache memory before performing the modify operation.

23. The processor of claim 20, wherein the cache line is to also hold the data object, and wherein, in response to the cache line holding the filter word and the data object in the private coherency state, the cache memory is provide a hit response to a subsequent read operation from the transaction to load either the filter word or the data object and to provide a miss response to another subsequent read operation from another transaction to load either the filter word or the data object.

24. A non-transitory machine readable medium including program code which, when executed by a machine, causes the machine, during runtime and before performing a transactional memory access operation from a transaction to access a data object, to perform the operations of:
    loading a filter value held in a filter field associated with the data object;
    in response to the filter value including an un-accessed value, logging a value associated with the data object in a log, storing an accessed value in the filter field within a memory line holding the filter field, and transitioning the memory line to a private coherency state; and
    in response to the filter value including the accessed value, not logging the value associated with the data object in the log, not storing the accessed value in the filter field, and not transitioning the memory line to a private coherency state.

25. The non-transitory machine readable medium of claim 24, wherein the filter field being associated with the data object includes the filter field being part of a software maintained data structure including the data object and the filter field.

26. The non-transitory machine readable medium of claim 24, wherein the transactional memory access operation includes a transactional read, and wherein the value associated with the data object includes a meta-data version value associated with the data object.

27. The non-transitory machine readable medium of claim 24, wherein the transactional memory access operation includes a transactional write, and wherein the value associated with the data object includes a previous, checkpointed value of the data object.

28. The non-transitory machine readable medium of claim 24, wherein the program code, which, when executed by a machine, further causes the machine to perform the operation of:
    providing a hit to a subsequent, in program order, load from the transaction of the filter field associated with the data object in response to the memory line holding the filter field in the private coherency state; and
    providing a miss to another load from another transaction of the filter field associated with the data object in response to the memory line holding the filter field in the private coherency state.

29. The non-transitory machine readable medium of claim 24, wherein the program code, which, when executed by a machine, further causes the machine to perform the operation of: not writing the filter value held in the filter field back to a higher-level memory upon eviction of the memory line holding the filter field responsive to the memory line holding the filter field in the private coherency state immediately before eviction of the memory line.

* * * * *